United States Patent
Symes et al.

(10) Patent No.: US 9,906,792 B2
(45) Date of Patent: Feb. 27, 2018

(54) RATE CONTROL IN VIDEO ENCODING

(71) Applicant: ARM Limited, Cambridge (GB)

(72) Inventors: Dominic Hugo Symes, Cambridge (GB); Ola Hugosson, Lund (SE); Erik Persson, Lund (SE)

(73) Assignee: ARM Limited, Cambridge (GB)

( * ) Notice: Subject to any disclaimer, the term of this patent is extended or adjusted under 35 U.S.C. 154(b) by 464 days.

(21) Appl. No.: 14/596,971

(22) Filed: Jan. 14, 2015

(65) Prior Publication Data

US 2015/0237346 A1   Aug. 20, 2015

(30) Foreign Application Priority Data

Feb. 19, 2014 (GB) .................................. 1402934.2

(51) Int. Cl.
*H04N 19/124* (2014.01)
*H04N 19/13* (2014.01)
*H04N 19/176* (2014.01)
*H04N 19/15* (2014.01)
*H04N 19/91* (2014.01)

(52) U.S. Cl.
CPC ........... *H04N 19/124* (2014.11); *H04N 19/13* (2014.11); *H04N 19/15* (2014.11); *H04N 19/176* (2014.11); *H04N 19/91* (2014.11)

(58) Field of Classification Search
None
See application file for complete search history.

(56) References Cited

U.S. PATENT DOCUMENTS

| 5,802,213 A | 9/1998 | Gardos | |
| 6,222,881 B1* | 4/2001 | Walker | H04N 19/176 375/240.02 |
| 2012/0307890 A1* | 12/2012 | Lu | H04N 19/176 375/240.03 |
| 2013/0301739 A1* | 11/2013 | Sato | H04N 19/176 375/240.24 |
| 2014/0341276 A1* | 11/2014 | Lee | H04N 19/176 375/240.03 |

FOREIGN PATENT DOCUMENTS

GB   2471887   11/2014

OTHER PUBLICATIONS

GB Search Report for GB No. 1402934.2, dated Aug. 6, 2014, 3 pages.

(Continued)

*Primary Examiner* — Andy Rao
*Assistant Examiner* — Samuel D Fereja
(74) *Attorney, Agent, or Firm* — Nixon & Vanderhye P.C.

(57) ABSTRACT

A video encoder and method of video encoding are provided. At an encoding stage a selected degree of quantization is applied to the encoding of macroblocks of the input video sequence and quantized part-encoded macroblocks are generated. Quantization circuitry in the encoding stage is configured to select the selected degree of quantization for each macroblock in a current slice in dependence on a complexity estimate indicative of the expected entropy encoding complexity of a predetermined set of the quantized part-encoded macroblocks defined for that macroblock.

21 Claims, 9 Drawing Sheets

(56) References Cited

OTHER PUBLICATIONS

Akramullah, S.M. et al., "A Data-Parallel Approach for Real-Time MPEG-2 Video Encoding", Journal of Parallel and Distributed Computing, vol. 30, pp. 129-146, (1995), 18 pages.
Bozoki, S. et al., "Scene Adaptive Rate Control in a Distributed Parallel MPEG Video Encoder", pp. 780-783, IEEE, (1997), 4 pages.
Hsu, C-Y., "Rate Control for Video Transmission Over Variable Rate Channels", A Dissertation Presented to the Faculty of the Graduate School, University of Southern California, (Aug. 1998), 132 pages.
Jiang, M. et al., "Low-Delay Rate Control for Real-Time H.264/AVC Video Coding", IEEE Transactions on Multimedia, pp. 467-477, vol. 8, No. 3, (Jun. 2006), 11 pages.
Rodriguez, A. et al., "Hierarchical Parallelization of an H.264/AVC Video Encoder", Proceedings of The International Symposium on Parallel Computing in Electrical Engineering (Parelec'06), (2006), 6 pages.

\* cited by examiner

------ STRIPE BOUNDARY

▇ CURRENT MACROBLOCK

▨ ALREADY PROCESSED MACROBLOCKS NOT USED FOR QUANTIZATION DECISION

▨ MACROBLOCKS USED FOR QUANTIZATION DECISION

BITSTREAM ORDER MACROBLOCKS

MB DEPENDENCY SET (N, MBX, MBY) IS THE
SET OF ALL MACROBLOCKS (n, X, Y) WHERE:

- $N - L < n \leq N$;
- $n * H \leq N * H + MBY$; AND
- $X \leq MBX + (N * H + MBY - n * H - Y)$ WHERE H IS THE PICTURE HEIGHT IN MACROBLOCKS
AND L IS THE ENCODING LATENCY IN PICTURES

RATE CONTROL IN VIDEO ENCODING

This application is claims priority to GB Application No. 1402934.2, filed 19 Feb. 2014, the entire content of which is hereby incorporated by reference.

TECHNICAL FIELD

The present disclosure relates to data processing. More particularly the present disclosure relates to video encoding.

BACKGROUND

It is known to provide dedicated hardware configured to perform video encoding, involving receiving a video sequence and encoding that video sequence into a compressed version which may be output as an encoded bitstream. Contemporary video encoders can be highly efficient, achieving both a very high level of compression of the input video sequence, using contemporary video compression formats such as H.264 or VP8, and by parallelizing the video encoding process to be performed by multiple processor cores.

The parallelization of the video encoding process across multiple processor cores may for example be implemented as shown in FIG. 1A, which represents a frame of a video sequence subdivided into macroblocks. In the single core example shown on the left, the processor core may simply proceed in raster scan order, and as represented in FIG. 1A, the hashed macroblocks have already been encoded by the processor core and the processor core is currently encoding the macroblock marked with a dot. In a multicore set up, the parallelization may be achieved by dividing the frame of the video sequence into slices where, as illustrated on the right in FIG. 1A, the two slices into which this (partial) frame has been subdivided are encoded independent of one another, one slice being allocated to a first processor core and the second slice being allocated to a second processor core.

The video encoding process itself is known to be provided as schematically illustrated in FIG. 1B. This shows how the macroblocks of the input video sequence are first subjected to a motion estimation process, then a transform is applied (such as the well known discrete cosine transform), and then quantization of the transformed coefficients is performed to achieve some of the data compression required.

The final stage of the encoding process is represented by the entropy coding block in FIG. 1B, after which the encoded macroblocks of the video can be output as an encoded bitstream. FIG. 1B also shows how size information relating to the output bitstream is fed back to the transform & quantization stage and in particular this bitrate information is applied to the quantization step to determine the level of quantization to apply to the transformed coefficients in order to enable the output bitstream bitrate to be maintained at a desired level.

It is also known, when seeking to implement a video encoder in a multi-core system, that advantage may be derived from splitting the video encoding process into two distant stages. This is schematically illustrated in FIG. 2. In this configuration in a first stage the motion estimation and transform & quantization processes mentioned above with reference to FIG. 1B are divided between the multiple processor cores available by allocating macroblocks to processor cores on a stripe basis, where a stripe represents a horizontal band of macroblocks (e.g. two macroblocks high) across a frame of the video sequence. The staggered nature of the processing of the respective stripes corresponds to the fact that the macroblocks of each stripe may have dependencies to on macroblocks of a previous stripe, and hence a certain time lag in the processing of each stripe is necessary to enable these dependencies to be resolved. The transformed & quantized macroblocks produced by each processor core at stage 1 are stored in an intermediate buffer from where they may be retrieved for the second stage of the video encoding process to be carried out. The second stage of the video encoding process is the entropy coding mentioned above with respect to FIG. 1B and, as shown in FIG. 2, is carried out on a slice basis by the respective processor cores in order to generate the output encoded video bitstream.

FIG. 2 also illustrates the fact that information from the output encoded video bitstream (in particular bitrate information) is fed back to the stage one video encoding process, so that the selection of a quantization parameter in the process of quantizing the transform coefficients may be made and a target bitrate for the output encoded video bitstream maintained. However, some disadvantages may arise in a video encoder configured in the manner represented in FIG. 2. On the one hand the number of macroblocks encoded depends on the timing of the individual cores, with the result that the bitstream output becomes dependent on the particular hardware timing. As a result, the encoding performance of such a configuration lacks consistency and repeatability which is undesirable. Secondly, the final number of bits used to encode a particular macroblock is not known until after the second stage of processing (bitstream entropy encoding) which can take place some time after the "stripe processing" stage (stage 1), giving a potentially significant latency to the feedback of the bitrate information.

SUMMARY

Viewed from a first aspect, there is provided a video encoder configured to perform a video encoding process comprising receiving an input video sequence and encoding the input video sequence on a slice-basis into an output bitstream, the video encoder comprising: an encoding stage comprising quantization circuitry configured to apply a selected degree of quantization to the encoding of macroblocks of the input video sequence to generate quantized part-encoded macroblocks, wherein the quantization circuitry is configured to select the selected degree of quantization for each macroblock in a current slice in dependence on a complexity estimate indicative of the expected entropy encoding complexity of a predetermined set of the quantized part-encoded macroblocks defined for that macroblock and does not depend on quantized part-encoded macroblocks outside the predetermined set, and wherein for at least one macroblock of the current slice the predetermined set does not include all previous output bitstream order macroblocks of the current slice.

Viewed from a second aspect there is provided a method of performing video encoding to encode an input video sequence on a slice-basis into an output bitstream comprising the steps of:

receiving the input video sequence; and applying a selected degree of quantization to the encoding of macroblocks of the input video sequence to generate quantized part-encoded macroblocks, wherein the selected degree of quantization for each macroblock in a current slice is selected in dependence on a complexity estimate indicative of the expected entropy encoding complexity of a predetermined set of the quantized part-encoded macroblocks defined for that macroblock and does not depend on quantized part-encoded macroblocks outside the predetermined set, and wherein for at least one macroblock of the current slice the predetermined set does not include all previous output bitstream order macroblocks of the current slice.

Viewed from a third aspect there is provided a video encoder configured to perform a video encoding process comprising receiving an input video sequence and encoding the input video sequence on a slice-basis into an output bitstream, the video encoder comprising:

means for receiving the input video sequence; and means for applying a selected degree of quantization to the encoding of macroblocks of the input video sequence to generate quantized part-encoded macroblocks, wherein the selected degree of quantization for each macroblock in a current slice is selected in dependence on a complexity estimate indicative of the expected entropy encoding complexity of a predetermined set of the quantized part-encoded macroblocks defined for that macroblock and does not depend on quantized part-encoded macroblocks outside the predetermined set, and wherein for at least one macroblock of the current slice the predetermined set does not include all previous output bitstream order macroblocks of the current slice.

BRIEF DESCRIPTION OF THE DRAWINGS

The present invention will be described further, by way of example only, with reference to embodiments thereof as illustrated in the accompanying drawings, in which.

DESCRIPTION OF EMBODIMENTS

Figure 1A:
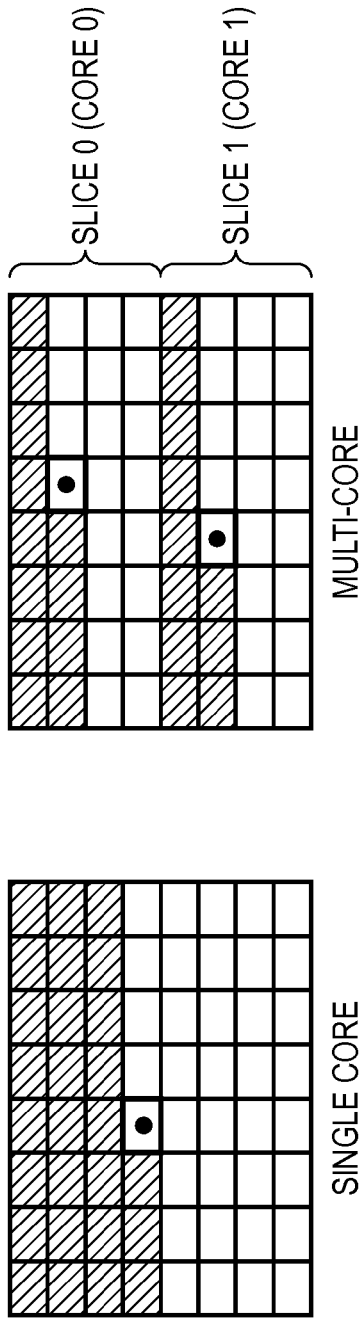
FIG. 1A schematically illustrates video encoding on a macroblock basis for both a single processor core video encoder and a multi-core video encoder according to prior art techniques.
Figure 1B:
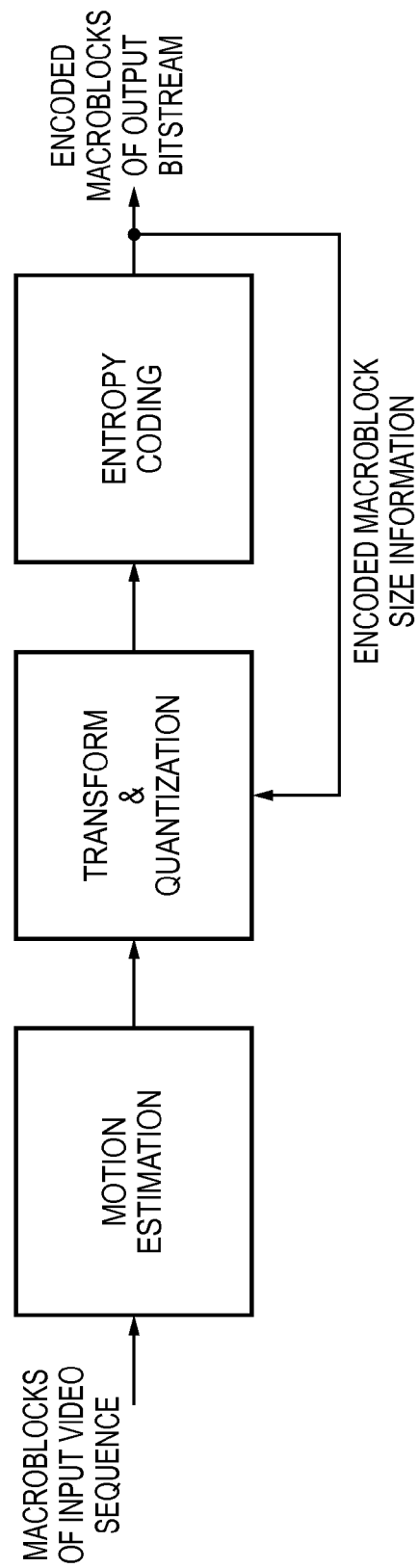
FIG. 1B schematically illustrates the main stages of a video encoding process according to a prior art technique.

In at least some example embodiments a video encoder is configured to perform a video encoding process comprising receiving an input video sequence and encoding the input video sequence on a slice-basis into an output bitstream, the video encoder comprising: an encoding stage comprising quantization circuitry configured to apply a selected degree of quantization to the encoding of macroblocks of the input video sequence to generate quantized part-encoded macroblocks, wherein the quantization circuitry is configured to select the selected degree of quantization for each macroblock in a current slice in dependence on a complexity estimate indicative of the expected entropy encoding complexity of a predetermined set of the quantized part-encoded macroblocks defined for that macroblock and does not depend on quantized part-encoded macroblocks outside the predetermined set, and wherein for at least one macroblock of the current slice the predetermined set does not include all previous output bitstream order macroblocks of the current slice.

The inventors of the present invention have realised that although the resulting encoding size (i.e. the number of encoded bits) of a given portion of the video sequence, and hence the resulting bitrate of the encoded video bitstream, cannot be known until after the final entropy coding has been performed by the video encoder, an advantageous degree of control over the encoded bitrate can be attained by guiding the operation of the quantization circuitry in the encoding stage (in particular in terms of the degree of quantization which it applies to the encoding of macroblocks) on the basis of a complexity estimate. This complexity estimate gives an indication of the expected entropy encoding complexity relating to the macroblock currently being encoded within the encoding stage. Accordingly, by basing the decision in the quantization circuitry as to the selected degree of quantization on this complexity estimate, which is already available at this encoding stage, the delays associated with the prior art techniques of basing such quantization decisions on bitrate information coming from the final output of the encoder can be avoided. By constructing the complexity estimate so that it is representative of the number of encoded bits that will result from an entropy encoding process of the encoder, but is nevertheless already available at the encoding stage, a more responsive (in terms of rate control) video encoder is provided.

Furthermore, the inventors of the present invention have found that by appropriately defining the predetermined set of quantized part-encoded macroblocks for each macroblock, a more consistent and repeatable quality of encoding can be achieved, whether the video encoder is configured to perform the video encoding process using only a single processor core, or is configured to perform the video encoding process using multiple processor cores. The specific choice of how this predetermined set is defined may vary from implementation to implementation, but for example by defining the set such that only quantized part encoded macroblocks which are certain to have already been processed are included, the above-mentioned consistency and repeatability of encoding performance is supported. In this regard it should be noted that the definition of the predetermined set thus also intentionally omits some macroblocks which, although they may have already been processed before the current macroblock being encoded, are not guaranteed to have been processed and as a result there are macroblocks in the current slice for which the predetermined set does not include all previous output bitstream order macroblocks of the current slice.

In some embodiments, the video encoder comprises multiple processor cores each configured to perform the video encoding process on a respective portion of the current slice, wherein the encoding stage of each of the multiple processor cores is configured not to operate on a selected macroblock in its respective portion until all macroblocks of the predetermined set defined for the selected macroblock have been processed by the encoding stage of one of the multiple processor cores.

Accordingly, when the video encoder performs its video encoding process on a given slice, the processing of that current slice may be parallelised across multiple processor cores. This parallelization enables the throughput of the video encoder to be increased. Moreover, the efficiency of the parallelized encoding process is supported, and the operation of the respective multiple processor cores is arranged to support the definition of the predetermined set for each macroblock being processed, by ensuring that all macroblocks of the predetermined set have passed through the encoding stage (of one of the multiple processor cores), so that the complexity estimate is assured to be calculable for the selected macroblock being processed by the encoding stage of the processor core handling that selected macroblock.

The subdivision of a current slice between multiple processor cores may be arranged in a variety of ways, but in one embodiment the respective portion of the current slice on which each processor core of the multiple processor cores is configured to perform the video encoding process is a horizontal stripe across a frame of the input video sequence. Thus, the allocation of encoding stage processing between the multiple processor cores may be on a stripe basis, where a stripe is for example defined as a two macroblock high strip across the width of the frame.

In some embodiments the encoding stage comprises transformation circuitry configured to apply transform coding to the encoding of macroblocks of the input video sequence, and the encoding stage is configured to determine the complexity estimate for each macroblock to which the transformation circuitry applies the transform coding. Accordingly, the encoding stage may comprise transformation circuitry which generates transform coefficients on the basis of the macroblocks it receives. The particular transform coding used by the transformation circuitry may vary, but as one example this transform coding may be based on a discrete cosine transformation. The encoding stage may then be configured to determine the complexity estimate for each set of transform coefficients generated by the transformation circuitry.

The complexity estimate may be defined in a variety of ways, but in some embodiments the complexity estimate is calculated on the basis of a number of bits in each quantized coefficient of the part-encoded macroblock processed by the encoding stage. It has been found that the number of bits in each quantized coefficient can form the basis of reliable indication of the number of bits which will be required to fully encode a given macroblock (i.e. at the output of the second encoding stage). Accordingly, by basing the complexity estimate on the number of bits in the respective quantized coefficients, the complexity estimate may give a reliable indication of the resulting encoded size of the fully encoded macroblock and hence its contribution to the final bitrate of the output bitstream.

In some embodiments, the complexity estimate is calculated on the basis of a number of significant bits in each quantized coefficient of the part-encoded macroblock processed by the encoding stage. In other words, the complexity estimate may depend on the number of bits required for each quantized coefficient to represent its respective value. For an unsigned value this means the number of bits up to and including the highest placed one bit in the number. For a signed value such as a quantized coefficient the complexity metric depends on the number of significant bits in the absolute value of the coefficient. This supports a more efficient and lower cost determination of the complexity estimate.

The particular form of the complexity estimate may vary, but in some embodiments is given by $\Sigma_f(\text{floor}(\log_2|c_k|))$ for $c_k \neq 0$, where f(k) is an integer valued function and $c_k$ is the quantized transform coefficient number k. Accordingly, the complexity estimate may be generated as a sum over a number of quantized coefficients, in particular for example a sum over the set of quantized coefficients given by the predetermined set, where the combination of a floor (i.e. mapping to the greatest integer less than or equal) function with a binary logarithm function ($\log_2$) to select the number of significant bits from each quantized transform coefficient. f(k) is an integer valued function which may take a variety of forms, but in some embodiments this is given by f(k)=k+constant, where for example the constant may be 1.

The particular definition of the predetermined set may take a variety of forms, but in one embodiment the predetermined set only comprises quantized part-encoded macroblocks in the current slice on which that macroblock is dependent for reference frame reconstruction. There may be a variety of ways in which a given macroblock is dependent on other macroblocks in the current slice being processed, but where that dependency is in terms of reference frame reconstruction, then the quantized part-encoded macroblocks of those reference macroblocks have been found generally to give a reliable indication of the encoding complexity of a macroblock which depends on them and these thus represent a useful set for the definition of the predetermined set.

In some embodiments the predetermined set only comprises macroblocks which precede that macroblock in raster scan order. The encoding of the macroblocks within a given frame will generally proceed in raster scan order and accordingly dependencies within that frame between the macroblocks will generally be constrained by this raster scan ordering and defining the predetermined set only to comprise macroblocks which precede the macroblock being encoded in raster scan order ensures that only macroblocks which have already been processed by the encoding stage (i.e. are now quantized part-encoded macroblocks) are included in the dependency set of the macroblock being processed.

In some embodiments the video encoder is configured to perform the video encoding process on each frame of the input video sequence beginning with an upper-left-most macroblock in the frame and ending with a lower-right-most macroblock in the frame, and wherein the predetermined set only comprises macroblocks which lie on, or upwards and leftwards of, a line of macroblocks running diagonally through that macroblock in a lower-left to upper-right direction. In other words, where the macroblocks are processed from top-left to bottom-right in a given frame, a line may be drawn through the macroblock currently being processed which runs between lower-left and upper-right in the frame and the predetermined set may be defined as comprising macroblocks which lie either on this line, or upwards and leftwards with respect to it.

In some embodiments the quantization circuitry is configured to adapt the selected degree of quantization in dependence on a user-specified target bitrate for the output bitstream. Accordingly, the output bitstream may have a target bitrate defined by the system user, and the quantization circuitry can adapt the selected agree of quantization to maintain this target bitrate. The target bitrate may also be specified in combination with a given tolerance, indicating how much the bitrate of the output bitstream is allowed to vary with respect to that target bitrate. These parameters can help to ensure that a video decoder which receives the encoded video bitstream maintains a suitable occupancy of its input buffer (i.e. not over-flowing or under-flowing).

In some embodiments, the quantization circuitry is configured to receive an indication of a current output bitstream bitrate from the second encoding stage and to adapt the selected degree of quantization in dependence on a current difference between the user-specified target bitrate and the current output bitstream bitrate. Accordingly, the quantization circuitry may not only adapt the selected degree of quantization in dependence on the complexity estimate, but may also adapt it in dependence on this feedback information about the current output bitstream bitrate. Thus, a shorter term adaptation may be performed on the basis of the complexity estimate, whilst a longer term adaptation may be performed on the basis of the difference between the user-specified target bitrate and the current output bitstream bitrate, resulting in an overall improved management of the output bitstream bitrate.

The quantization circuitry may be configured to select a quantization algorithm to use at a variety of different intervals, in dependence on the particular performance required, but in some embodiments the quantization circuitry is configured to select a quantization algorithm to use to produce the quantized part-encoded macroblocks for each new frame in the input video sequence. Further, in some embodiments, the quantization circuitry is configured to select the quantization algorithm to use to produce the quantized part-encoded macroblocks for each new stripe in the input video sequence. Still further, in some embodiments the quantization circuitry is configured to select the quantization algorithm to use to produce the quantized part-encoded macroblocks for each new macroblock in the input video sequence.

In some embodiments the predetermined set may be defined slightly differently for the first macroblock of a new frame, and in some embodiments the quantization circuitry is configured to define the predetermined set of the quantized part-encoded macroblocks in the current slice for a first macroblock of a new frame in the input video sequence as a selected macroblock in a last row of an immediately preceding frame in the input video sequence. Due to the session switching which may be associated with starting the encoding of a new frame, it may be case that little information relating to the previously performed encoding is normally available when performing the encoding of a first macroblock of a new frame. It is therefore advantageous to define a special predetermined set to use in this situation, to enable the mechanisms set up for determining the complexity estimate also to be used for the first macroblock of a new frame, such that any macroblock being encoded can participate in the rate control techniques described herein. Defining the predetermined set as a selected macroblock in a last row of an immediately preceding frame in the input video sequence facilitates this, as the information relating to this selected macroblock in the last low of the preceding frame can be relatively easily specially buffered to support this. This may for example additionally require that when switching between frames, and therefore session switching, that the last stripe of a previous frame is specially stored such that this macroblock is available.

The selected macroblock in the last row may be variously defined, but in some embodiments the selected macroblock is the second macroblock in the last row of the immediately preceding frame.

In at least some example embodiments a method of performing video encoding to encode an input video sequence on a slice-basis into an output bitstream comprises the steps of:

receiving the input video sequence; and applying a selected degree of quantization to the encoding of macroblocks of the input video sequence to generate quantized part-encoded macroblocks, wherein the selected degree of quantization for each macroblock in a current slice is selected in dependence on a complexity estimate indicative of the expected entropy encoding complexity of a predetermined set of the quantized part-encoded macroblocks defined for that macroblock and does not depend on quantized part-encoded macroblocks outside the predetermined set, and wherein for at least one macroblock of the current slice the predetermined set does not include all previous output bitstream order macroblocks of the current slice.

In at least some example embodiments a video encoder is configured to perform a video encoding process comprising receiving an input video sequence and encoding the input video sequence on a slice-basis into an output bitstream, the video encoder comprising:

means for receiving the input video sequence; and means for applying a selected degree of quantization to the encoding of macroblocks of the input video sequence to generate quantized part-encoded macroblocks, wherein the selected degree of quantization for each macroblock in a current slice is selected in dependence on a complexity estimate indicative of the expected entropy encoding complexity of a predetermined set of the quantized part-encoded macroblocks defined for that macroblock and does not depend on quantized part-encoded macroblocks outside the predetermined set, and wherein for at least one macroblock of the current slice the predetermined set does not include all previous output bitstream order macroblocks of the current slice.

Figure 3:
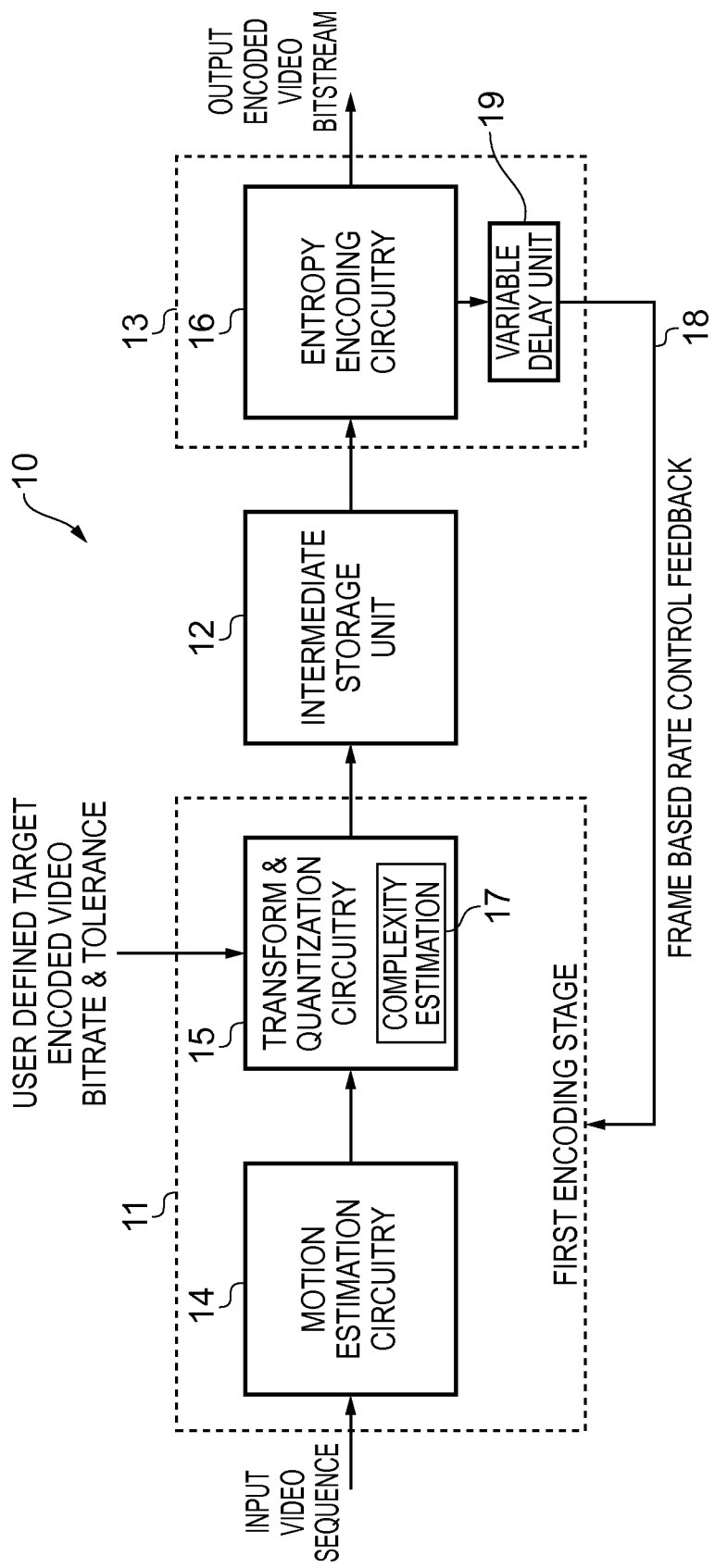
FIG. 3 schematically illustrates a video encoder in one embodiment.

FIG. 3 schematically illustrates a video encoder 10 in one embodiment. The video encoder 10 comprises three main portions, a first encoding stage 11, an intermediate storage unit 12 and a second encoding stage 13. The first encoding stage 11 comprises motion estimation circuitry 14 and transform & quantization circuitry 15. The second encoding stage comprises the entropy encoding circuitry 16. The video encoder is configured to receive an input video sequence and to encode this into an encoded video bitstream. It will be clear to one of ordinary skill in the art that the illustration in FIG. 3 of the video encoder 10 is only at a relatively high conceptual level, given that one of ordinary skill of the art is familiar with the detail of, for example, how the motion estimation circuitry 14 and the entropy encoding circuitry 16 is configured, and for brevity further detail of these components is not provided here.

The video encoder 10 is configured with a particular view to enable the bitrate of the output encoded video bitstream to be controlled, and in particular for the user to be able to specify a bitstream bitrate to be maintained at the output. The user may further specify a given tolerance by which the output encoded video bitstream is allowed to vary with respect to the specified bitstream bitrate, which may for example be determined by the intended recipient of the encoded video bitstream, i.e. a video decoder with a particular input buffer size. Maintaining the bitrate of the output encoded video bitstream as specified by the target bitrate and tolerance enables such an input buffer to be maintained at a practical occupancy, i.e. not over-flowing or under-flowing. A particular feature of note in the video encoder 10 is the complexity estimation circuitry 17 provided within the transform & quantization circuitry 15. This complexity estimation circuitry 17 enables the transform & quantization circuitry 15, and in particular the quantization component therein, to adjust the bitrate of the quantized part-encoded macroblocks which it stores into the intermediate storage unit 12 to be varied (by varying the degree of quantization of each macroblock). The transform & quantization circuitry 15 is thus able to adjust the degree of quantization for each macroblock within a feedback mechanism which more closely represents the current bitrate associated with the part-encoded macroblocks being generated by the quantization circuitry of the transform & quantization circuitry 15, rather than the much slower feedback which might be provided by using the bitrate of the output encoded video bitstream to inform the quantization level decisions being made by the quantization circuitry. Nevertheless, note that this slower variety of feedback is also provided in the present embodiment, as represented by the feedback path 18 in FIG. 3 which provides frame based rate control information from the second encoding stage 13 back to the first encoding stage 11. Accordingly, the video encoder 10 is configured to have two mechanisms by which it can adapt the bitrate of the output encoded video bitstream which it generates. A first, faster feedback is provided by the complexity estimation 17, whilst a second, slower feedback is provided by the frame based rate control feedback 18. Note also that the frame based rate control feedback 18 is subject to a variable delay (imposed by variable delay unit 19) configured so that picture N being encoded depends on feedback from picture N-L for a predetermined L, regardless of whether more pictures have been completed than N-L. This ensures that the feedback carried by path 18 is independent of the number of cores operating. L is determined based on the maximum number of cores to be used for the encoding.

It should be noted that the macroblocks referred to herein are 16×16 blocks of pixels, but the present technique is not limited to such macroblock sizes and can equally be used with other block sizes such as 32×32 and 64×64 (as are used for newer video standards such as HEVC or VP9).

Figure 2:
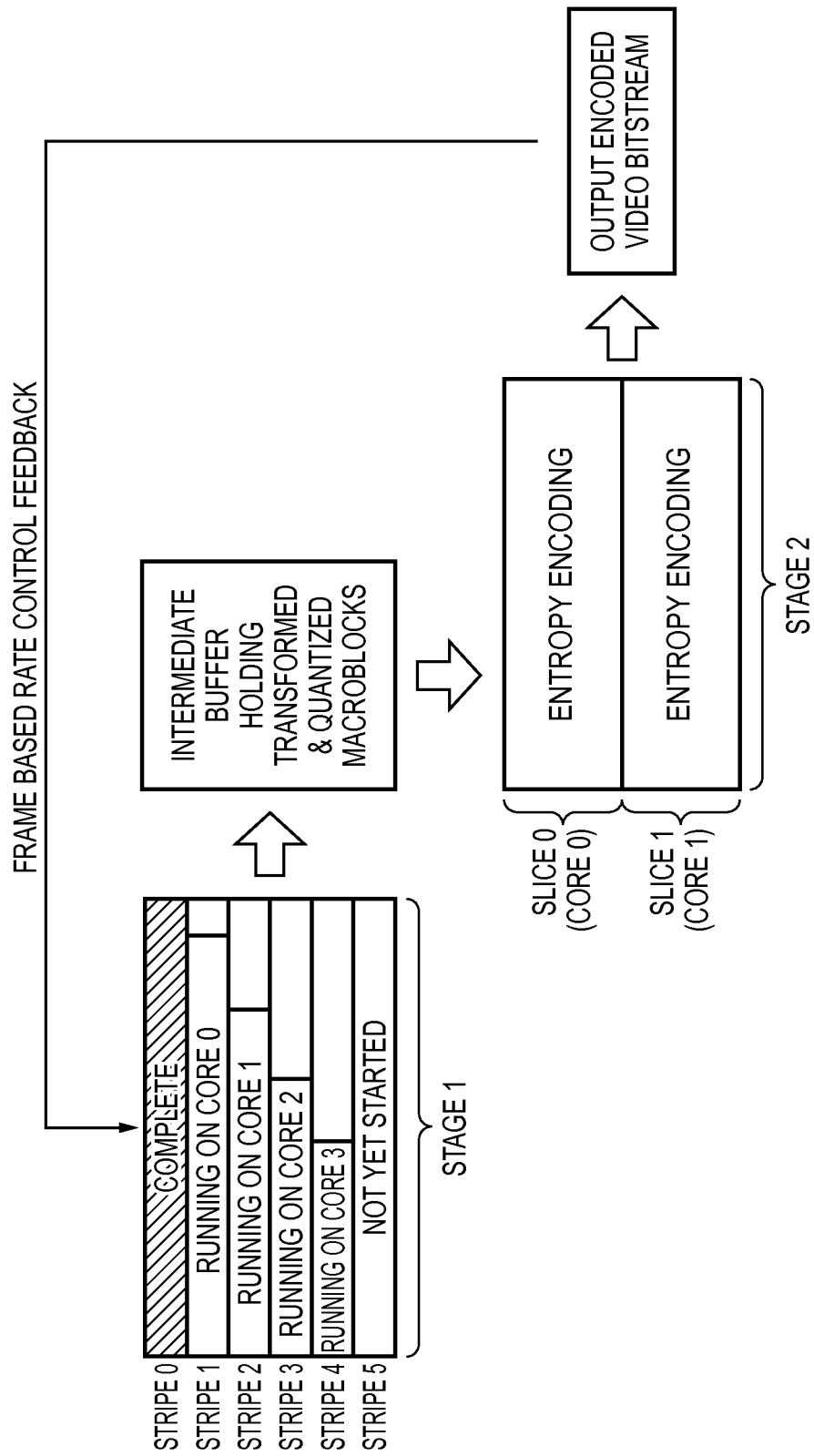
FIG. 2 schematically illustrates the sub-division of a video encoding process into a first stage which generates transformed and quantized macroblocks and a second stage which performs entropy encoding according to a prior art technique.
Figure 4:
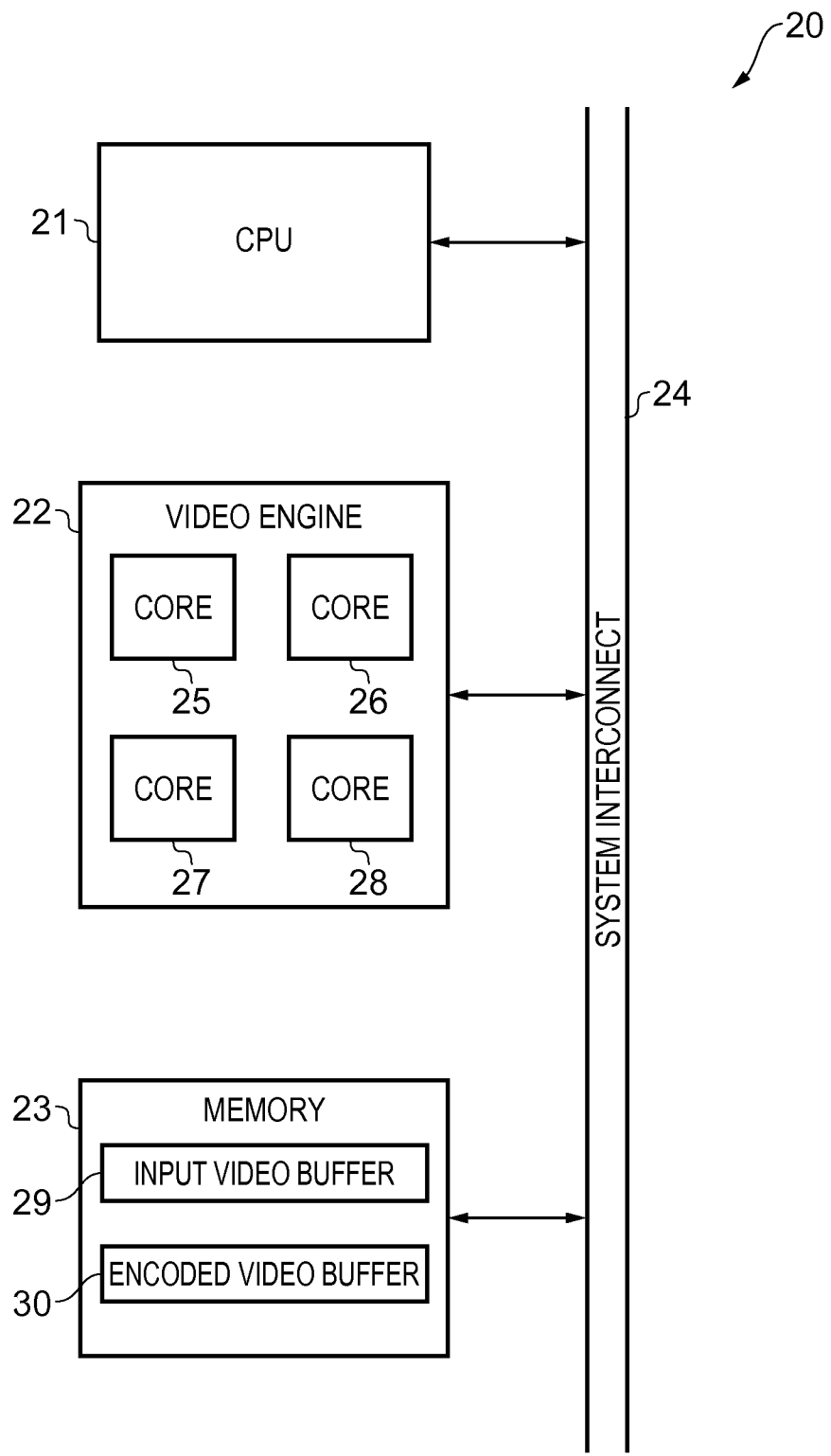
FIG. 4 schematically illustrates a data processing system comprising a multi-core video engine configured to perform video encoding in one embodiment.

The video encoder 10 shown in FIG. 3 may for example form part of a data processing system 20 such as that schematically illustrated in FIG. 4. The data processing system 20 comprises a central processing unit (CPU) 21, a video engine 22 and a memory 23, which are coupled together via a system interconnect 24. Accordingly, the CPU 21 and video engine 22 can access data values stored in the memory. The video engine 22 comprises four video cores 25-28, which are configured to perform video processing activities, and of relevance to the present context are each configured to act as a video encoder and therefore to perform a video encoding process. Hence, each video core 25-28 can retrieve part of an input video sequence to be encoded from storage in the input video buffer 29 via the system interconnect 24 and perform a video encoding process thereon, and then subsequently return the corresponding portion of the output encoded video into the encoded video buffer 30 via the system interconnect 24. For example, when performing video encoding in parallel with one another, the video cores 25-28 can process a slice of the input video sequence as is illustrated in FIG. 2, wherein the slice is subdivided into stripes (each being a stripe two macroblocks high and spanning the width of the video frame) such that stripes are allocated to the video cores sequentially for processing (stage 1 as shown in FIG. 2). The stripe height may also be set differently—for example the stripe height may also be set to four macroblock rows. It worth noting that in the embodiment illustrated in FIGS. 3 and 4 the first processing stage 11 and second processing stage 13 are parallelized over the multiple cores differently—the first over stripes and the second over slices. This enables multiple cores to work on the same picture for the first stage regardless of the number of slices in the frame. The entropy coding stage 13 always works on slices. There is an overhead in terms of coding efficiency in splitting a picture into a number of slices and so it is advantageous to have a first processing stage (the reconstruction loop) where the parallelization is stripe rather than slice based.

Figure 5:
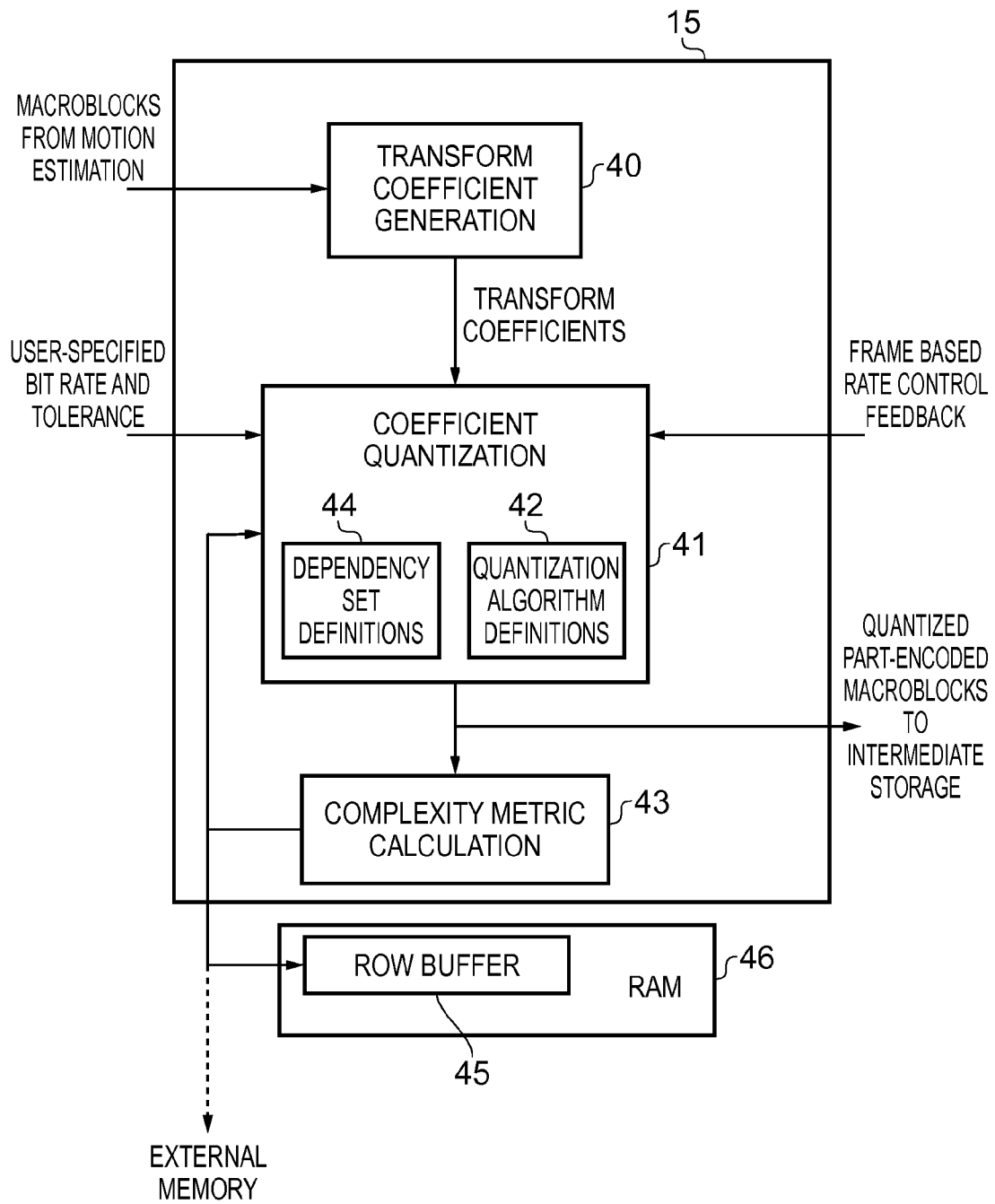
FIG. 5 schematically illustrates more detail of the transform & quantization circuitry shown in FIG. 3.

FIG. 5 schematically illustrates more detail of the transform & quantization circuitry 15 shown in FIG. 3 to be part of the video encoder 10. The transform & quantization circuitry 15 receives macroblocks from the motion estimation circuitry 14 and generates quantized part-encoded macroblocks which it stores in the intermediate storage unit 12. The two main processing stages for these macroblocks are represented by the transform coefficient generation unit 40 and the coefficient quantization unit 41. The transform coefficient generation unit 40 is configured to generate transform coefficients on the basis of a selected transform coding (e.g. a discrete cosine transform). These transform coefficients are then quantized by the coefficient quantization unit 41 in accordance with a particular quantization algorithm. The coefficient quantization unit 41 holds various quantization algorithms definitions 42 which it can make use of, and select between, when performing the quantization. A particular feature of the operation of the coefficient quantization unit 41 which is of relevance to the present disclosure is its configuration to select the degree of quantization for each macroblock which it processes. To do this, the coefficient quantization unit 41 makes use of the processing performed by the complexity metric calculation unit 43, which also performs part of the transform & quantization circuitry 15. This complexity metric calculation unit 43 is configured to receive the quantized part encoded macroblocks generated by the coefficient quantization unit 41 and for each macroblock to calculate a complexity metric.

The complexity metric calculation unit 43 is configured to calculate the complexity metric contribution from each macroblock for which it receives coefficient information from coefficient quantization unit 41. To do this a predetermined function is applied to each quantized transform coefficient, wherein the predetermined function is arranged such that the complexity estimate depends on the number of significant bits that (non-zero) quantized transform coefficient. In the example embodiment illustrated, the complexity metric contribution from each macroblock is calculated by applying the following function to each quantized transform coefficient:

$$f(\mathrm{floor}(\log_2|c_k|)),$$

where the floor function maps the input value to the greatest integer less than or equal to the input value, and where $c_k$ is the quantized transform coefficient k. In this embodiment $f(k)=k+1$. It can be seen therefore that the combination of the floor function and the $\log_2$ function mean that the complexity metric is based on the number of significant bits of each quantized transform coefficient.

The complexity metric value for a given macroblock depends on the predetermined set of other macroblocks which make up the dependency set for that given macroblock. These dependency set definitions are held within coefficient quantization unit 41 by the dependency set definitions 44, and are predetermined for each macroblock of a frame. The complexity metric value for a given macroblock, for the illustrated example embodiment, is then given by:

$$\Sigma_j(\mathrm{floor}(\log_2|c_k|)) \text{ for } c_k \neq 0.$$

By appropriate definition of the dependency set, this complexity metric then gives an accurate estimate of the number of entropy encoded bits which will be used for this macroblock. Note that the complexity metric definition is chosen so that the above sum of all macroblocks in the largest set of macroblocks that can be encountered will not overflow an unsigned 32-bit integer to facilitate the handling of this value.

In response to the complexity metric thus determined for a given macroblock, the video encoder can then therefore vary the bitrate generated by adjusting a quantization parameter used within the transform and quantization circuitry 15, and in particular within coefficient quantization unit 41. The conversion of a particular complexity metric value into a selected quantization parameter is done with reference to a predetermined table of conversions, which are empirically generated for a given combination of encoding standard (e.g. H.264 CAVLC), slice type (i.e. I, P or B) and quantization parameter (e.g. ranging from 0 to 51 for H.264) on the basis of the typical number of bits for typical content (averaged across a range of content), such that a conversion between a number of bits and a quantization parameter can be made. Thus, for a given complexity metric value (i.e. number of bits) a quantization parameter can be appropriately selected. This table of conversions can also be updated by information received on the long term feedback path 18.

The coefficient quantization unit 41 is also configured to vary the bitrate generated in dependence on the frame based rate control feedback which it receives from the second encoding stage 13 and in particular from the output of the entropy encoding circuitry 16 of the processor core which is performing this final stage of the encoding process. Accordingly, the coefficient quantization unit 41 is configured to adapt the bitrate in dependence on two factors: the frame based rate control information which provides longer term feedback on the bitrate; and the complexity estimate which provides shorter term feedback on the bitrate. The adjustment of the bitrate is performed with reference to the user-specified bitrate and tolerance which are provided to the coefficient quantization unit 41. The combination of the bitrate and tolerance can for example correspond to the expected buffer size of the decoder which is expected to receive the encoded video bitstream, but more generally these parameters can be freely set by the system user.

The particular quantization algorithm which the coefficient quantization unit 41 uses is selected from the quantization algorithm definitions 42. This selection of quantizer can be made per frame (e.g. when coding according to VP8), per stripe (e.g. when coding according to H.264), or can even be selected on a macroblock by macroblock basis.

Note also that the complexity estimate values generated by complexity metric calculation unit 43 are also stored out to a row buffer 45 (which in the illustrated example in FIG. 5 is provided in an internal RAM 46, but could also be held in external memory) so that the complexity estimate values can be read in again by the core running the next stripe.

On an ongoing basis the complexity estimate for the predetermined set is calculated for a given macroblock by taking the complexity estimate for the predetermined set of the top right macroblock (from the row buffer), adding the complexity metrics of the macroblocks to the left (stored locally in transform circuitry 15) and finally adding the complexity metric for the current macroblock.

Figure 6A:
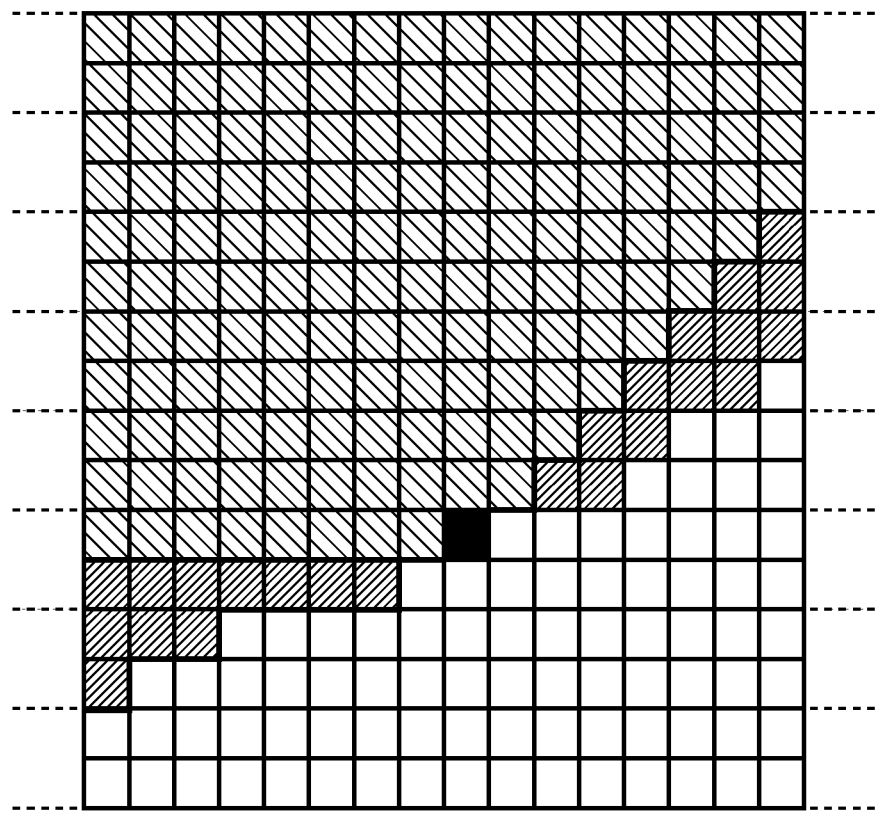
FIGS. 6A, 6B and 6C illustrate the predetermined set of quantized part-encoded macroblocks which are used in the determination of a complexity estimate for a selected current macroblock in one embodiment.
Figure 6B:
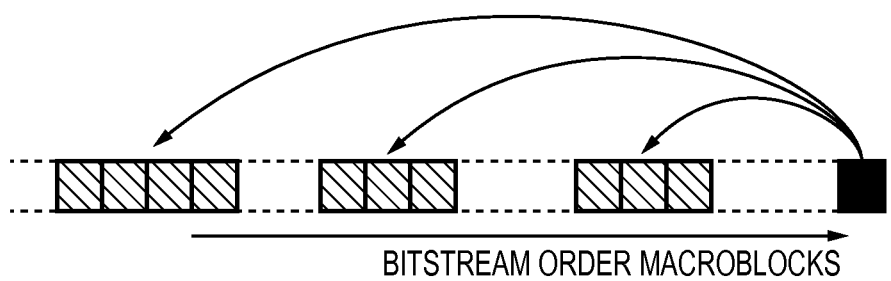

The predetermined set of quantized part-encoded macroblocks which provide the complexity estimate for a current macroblock being processed in one embodiment is shown in FIG. 6A. The dashed lines in FIG. 6A show the stripe boundaries and accordingly also the subdivision of the macroblocks of the frame between the processor cores of the apparatus. The diagram shows a current macroblock (shaded) and the macroblocks (left-hatching) that the macroblock already can depend on (for MV or intra prediction, for example). Other macroblocks may have been processed (right-hatching) but are not relied on for the rate control decision, as in general the number of right-hatched macroblocks depends on the stripe height and stripe process timing Hence although all the hatched macroblocks have already been processed at the instant shown in FIG. 6A, only those with the left-slanted hatching are used to determine the complexity estimate value for the shaded current macroblock, and the right-slanted hatched macroblocks, although already processed at the first encoding stage, do not form part of the predetermined set of macroblocks from which the complexity estimate value for the shaded current macroblock is calculated. This ensures that, despite the encoding process being parallelized across multiple processor cores, the encoding of the shaded current macroblock will not depend on the current performance of each of those processor cores. One feature which supports this is that each of the multiple processor cores is configured such that processing of the shaded current macroblock will not start until all of the left-slanted hatched macroblocks have already been processed (by that processor core or one of the other processor cores). As a result of this choice of predetermined set of macroblocks from which the complexity estimate value for the shaded current macroblock is calculated, there are macroblocks in each slice for which, as shown in FIG. 6B, the predetermined set does not include all previous bitstream order macroblocks.

Figure 6C:
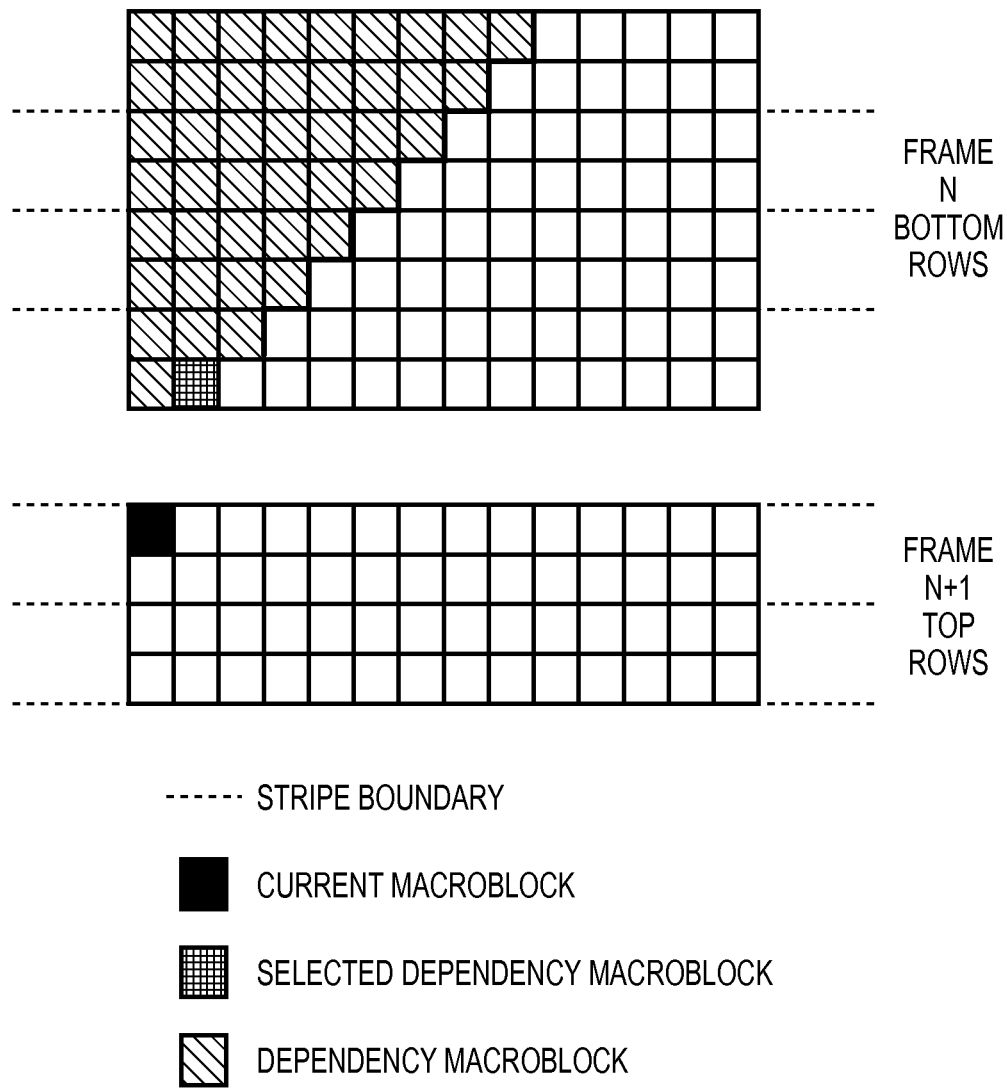

FIG. 6C illustrates a particular situation, namely that which arises when deciding the initial quantization parameter for the first macroblock of a picture (fully shaded in the figure). In this situation the macroblock is treated as being dependent on the second macroblock of the last row of the previous picture (cross hatched). Note that this is not a macroblock that the top macroblock usually depends on and that this covers the normal stripe dependency across picture boundaries. This dependency is selected however as it provides a simple way of tracking the data so that all macroblocks are covered in the rate control. However, it introduces a new issue in the session switching, as the stripe row buffer data is not preserved across a session switch and so this data will be lost there. Instead, firstly, the last stripe of a job is handled specially and the rate control information is stored out to external memory rather than to local RAM. Secondly, the first stripe of a job is handled specially and rate control information is loaded in from external memory rather than local RAM.

Figure 7:
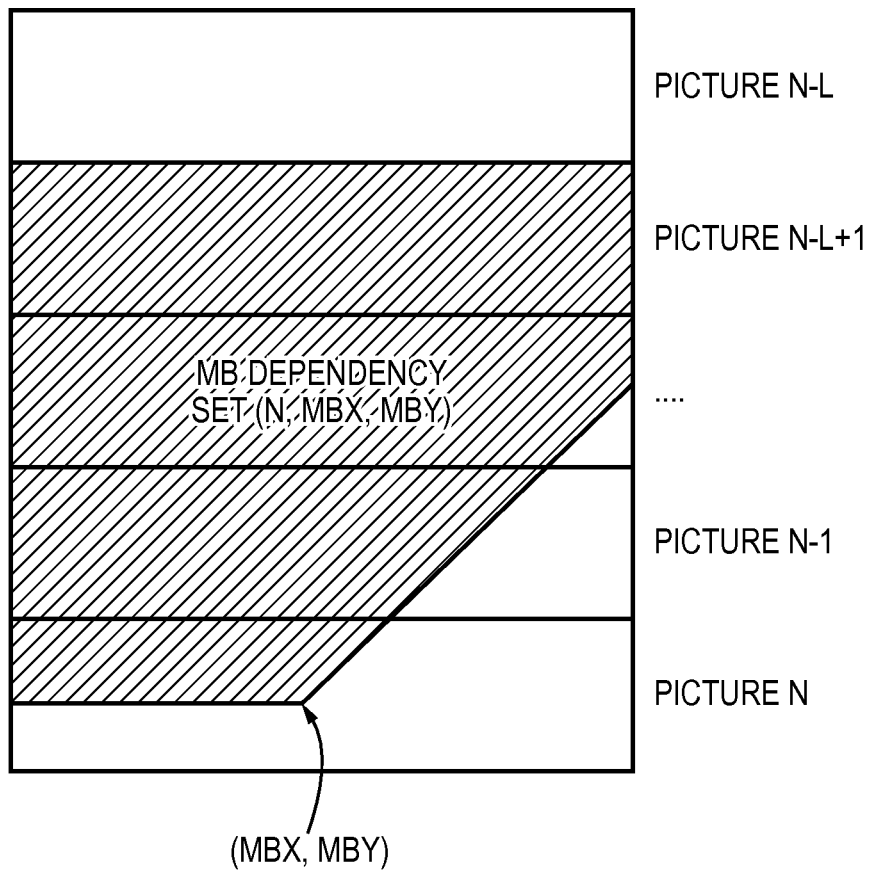
FIG. 7 illustrates how the macroblock dependency set may be defined in one embodiment.

FIG. 7 illustrates the definition of the predetermined set in one embodiment. When processing picture N, the total number of bits and complexity metric for pictures up to and including picture N-L are known and passed as information in the picture job. Hence the row buffer needs to store accumulated information for new data generated since picture N-L. L is the latency of the feedback path 18 (see FIG. 3) in terms of frames.

For a macroblock at coordinate (mbx, mby) in picture N, MB Dependency Set (N, mbx, mby) is defined to be the set of all macroblocks (n, x, y) such that the following all hold:

picture number n satisfies $N-L<n<=N$;

$n*H+y<=N*H+mby$ where H is the picture height in macroblocks; and $x<=mbx+(N*H+mby-n*H-y)$ In other words, MB Dependency Set (N, mbx, mby) is the hatched area in FIG. 7. Note that the dependency set is used rather than just accumulating all previous macroblocks to prevent overflow of the rate control values stored in the row buffer.

Figure 8:
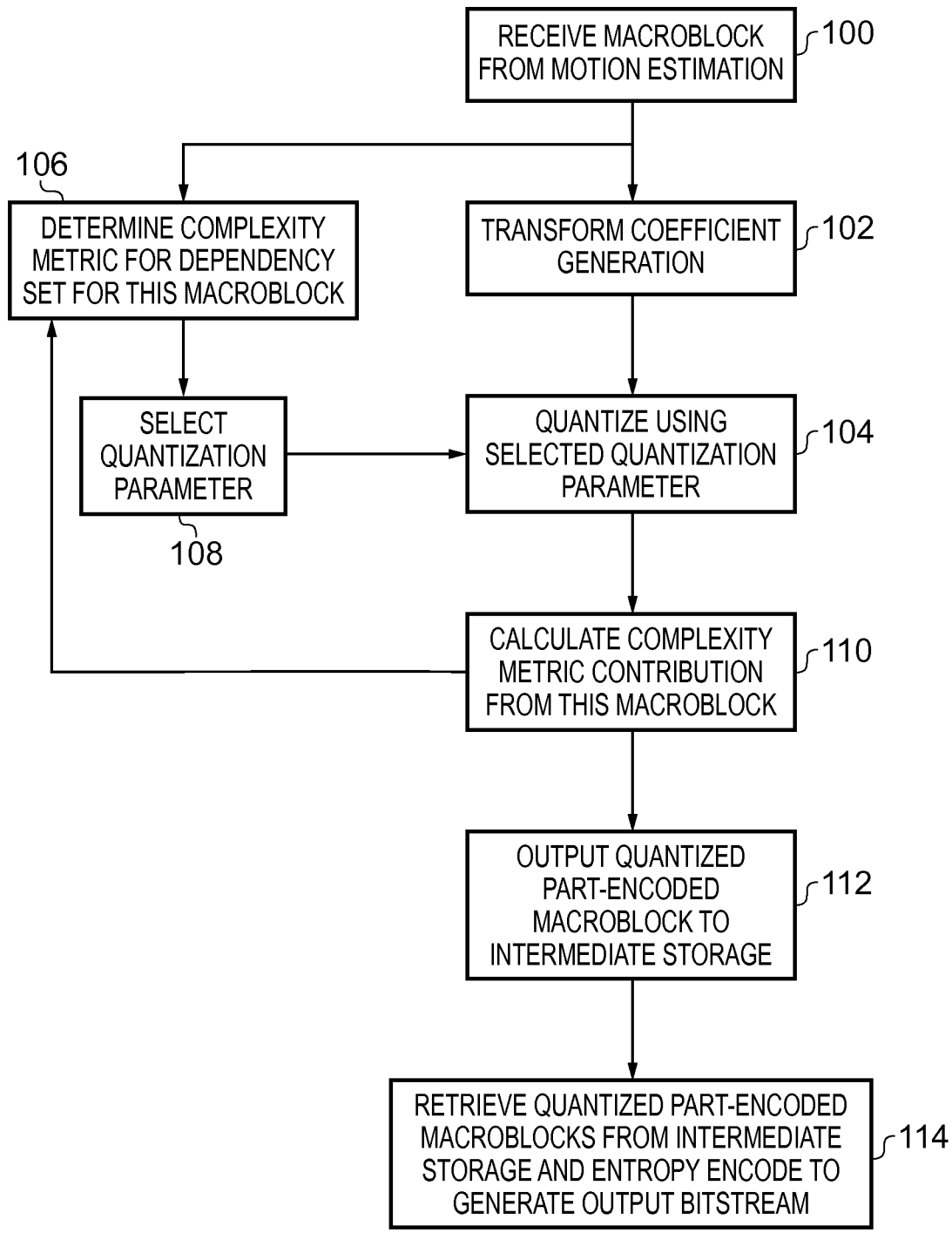
FIG. 8 schematically illustrates a series of steps which are taken in the method of one embodiment.

FIG. 8 schematically illustrates a sequence of steps which are taken in the method of one embodiment. The flow begins at step 100, where the transform & quantization circuitry receives a macroblock for processing from the motion estimation circuitry. Accordingly it will be understood that previous to the illustrated steps an input video sequence has been received and subjected to a motion estimation process which generated this macroblock. The macroblock is passed to the transform generation circuitry, which generates (at step 102) respective transform coefficients for this macroblock (for example using a discrete cosine transform). These transform coefficients are then quantized (at step 104) using a selected quantization parameter, i.e. are quantized to a selected degree in dependence on what that quantization parameter is set to. The quantized transform coefficients of this macroblock at then (at step 110) used to determine the complexity metric contribution from this macroblock. This complexity metric calculation forms one input to step 106 of the illustrated flow, at which the complexity metric for the dependency set for the current macroblock being processed is determined. Accordingly step 106 also has an input from step 100, informing which the current macroblock is. The complexity metric determined for the dependency set of the current macroblock at step 106 then provides the input for step 108, at which a quantization parameter is selected in dependence on the value of the complexity metric. In particular, a quantization parameter is selected to enable the encoder to meet the user-defined bitrate target, within the specified tolerances. This selected quantization parameter thus provides another input to step 104, at which the quantization using that parameter is carried out. It should however be appreciated that the quantization parameter for the current macroblock (selected at step 108 and applied at step 104) depends on the complexity metric of the dependency set for this macroblock excluding the current macroblock (since the complexity is only known once it is quantized). Once the macroblock has been quantized (at step 104) then the complexity of the current macroblock is further included (path from step 110 to step 106) by being stored in the row buffer.

Following step 110, the quantized part-encoded macroblock is output to the intermediate storage (at step 112). Later, at the second encoding stage, at step 114, the quantized part-encoded macroblocks stored in the intermediate storage are retrieved for the entropy encoding process to be carried out (on a slice basis) to generate the output encoded bitstream.

In overall summary, a video encoder and method of video encoding are provided. At a first encoding stage a selected degree of quantization is applied to the encoding of macroblocks of the input video sequence and quantized part-encoded macroblocks are stored to an intermediate storage unit. At second encoding stage the quantized part-encoded macroblocks are retrieved from the intermediate storage unit and are entropy encoded to generate the output bitstream. Quantization circuitry in the first encoding stage is configured to select the selected degree of quantization for each macroblock in a current slice in dependence on a complexity estimate indicative of the expected entropy encoding complexity of a predetermined set of the quantized part-encoded macroblocks defined for that macroblock.

Although a particular embodiment has been described herein, it will be appreciated that the invention is not limited thereto and that many modifications and additions thereto may be made within the scope of the invention. For example, various combinations of the features of the following dependent claims could be made with the features of the independent claims without departing from the scope of the present invention.

The invention claimed is:

1. A video encoder configured to perform a video encoding process comprising receiving an input video sequence and encoding the input video sequence on a slice-basis into an output bitstream, the video encoder comprising:
an encoding stage comprising quantization circuitry configured to:
apply a selected degree of quantization to the encoding of macroblocks of the input video sequence to generate quantized part-encoded macroblocks,
select the selected degree of quantization for each macroblock in a current slice in dependence on a complexity estimate indicative of an expected entropy encoding complexity of a predetermined set of the quantized part-encoded macroblocks defined for that macroblock and does not depend on quantized part-encoded macroblocks outside the predetermined set, and
receive an indication of an output bitstream bitrate from the video encoder and adapt the selected degree of quantization in dependence on a difference between a user-specified target bitrate for the output bitstream and the output bitstream bitrate,
wherein the video encoder is configured to apply a variable delay to the indication of the output bitstream bitrate from the video encoder such that a current picture being quantized by the quantization circuitry is dependent on a previous picture,
wherein a predetermined number of pictures separates the current picture from the previous picture regardless of whether the video encoder has already encoded beyond the previous picture, and
wherein for at least one macroblock of the current slice the predetermined set does not include all previous output bitstream order macroblocks of the current slice.

2. The video encoder as claimed in claim 1, wherein the video encoder comprises multiple processor cores each configured to perform the video encoding process on a respective portion of the current slice, wherein the encoding stage of each of the multiple processor cores is configured not to operate on a selected macroblock in its respective portion until all macroblocks of the predetermined set defined for the selected macroblock have been processed by the encoding stage of one of the multiple processor cores.

3. The video encoder as claimed in claim 2, wherein the respective portion of the current slice on which each processor core of the multiple processor cores is configured to perform the video encoding process is a horizontal stripe across a frame of the input video sequence.

4. The video encoder as claimed in claim 1, wherein the encoding stage comprises transformation circuitry configured to apply transform coding to the encoding of macroblocks of the input video sequence, and the encoding stage is configured to determine the complexity estimate for each macroblock to which the transformation circuitry applies the transform coding.

5. The video encoder as claimed in claim 1, wherein the complexity estimate is calculated on the basis of a number of bits in each quantized coefficient of the part-encoded macroblock processed by the encoding stage.

6. The video encoder as claimed in claim 1, wherein the complexity estimate is calculated on the basis of a number of significant bits in each quantized coefficient of the part-encoded macroblock processed by the encoding stage.

7. The video encoder as claimed in claim 1, wherein the complexity estimate is calculated on the basis of a constant plus a number of significant bits in each quantized coefficient of the part-encoded macroblock processed by the encoding stage.

8. The video encoder as claimed in claim 1, wherein the complexity estimate is calculated on the basis of an absolute value of each quantized coefficient of the part-encoded macroblock processed by the encoding stage.

9. The video encoder as claimed in claim 1, wherein the complexity estimate is a sum over complexity estimates for each non-zero quantized coefficient of the part-encoded macroblock processed by the encoding stage.

10. The video encoder as claimed in claim 1, wherein the predetermined set only comprises quantized part-encoded macroblocks in the current slice on which that macroblock is dependent for reference frame reconstruction.

11. The video encoder as claimed in claim 1, wherein the predetermined set only comprises macroblocks which precede that macroblock in raster scan order.

12. The video encoder as claimed in claim 1, wherein the video encoder is configured to perform the video encoding process on each frame of the input video sequence beginning with an upper-left-most macroblock in the frame and ending with a lower-right-most macroblock in the frame,
and wherein the predetermined set only comprises macroblocks which lie on, or upwards and leftwards of, a line of macroblocks running diagonally through that macroblock in a lower-left to upper-right direction.

13. The video encoder as claimed in claim 1, wherein the video encoder comprises multiple processor cores each configured to perform the video encoding process on a respective portion of the current slice,
and wherein the video encoder is further configured to determine the predetermined number of pictures which separates the current picture from the previous picture as: a number of the multiple processor cores divided by a minimum number of slices per frame, plus a constant.

14. The video encoder as claimed in claim 1, wherein the quantization circuitry is configured to select a quantization algorithm to use to produce the quantized part-encoded macroblocks for each new frame in the input video sequence.

15. The video encoder as claimed in claim 14, wherein the quantization circuitry is configured to select the quantization algorithm to use to produce the quantized part-encoded macroblocks for each new stripe in the input video sequence.

16. The video encoder as claimed in claim 15, wherein the quantization circuitry is configured to select the quantization algorithm to use to produce the quantized part-encoded macroblocks for each new macroblock in the input video sequence.

17. The video encoder as claimed in claim 1, wherein the quantization circuitry is configured to define the predetermined set of the quantized part-encoded macroblocks in the current slice for a first macroblock of a new frame in the input video sequence as a selected macroblock in a last row of an immediately preceding frame in the input video sequence.

18. The video encoder as claimed in claim 17, wherein the selected macroblock is the second macroblock in the last row of the immediately preceding frame.

19. The video encoder as claimed in claim 1, further comprising:
an intermediate storage unit into which the encoding stage is configured to store the quantized part-encoded macroblocks; and
a second encoding stage comprising entropy encoding circuitry configured to retrieve the quantized part-encoded macroblocks from the intermediate storage unit and to entropy encode the quantized part-encoded macroblocks to generate the output bitstream.

20. A method of performing video encoding to encode an input video sequence on a slice-basis into an output bitstream comprising the steps of:
receiving the input video sequence; and
applying a selected degree of quantization to the encoding of macroblocks of the input video sequence to generate quantized part-encoded macroblocks,
wherein the selected degree of quantization for each macroblock in a current slice is selected in dependence on a complexity estimate indicative of an expected entropy encoding complexity of a predetermined set of the quantized part-encoded macroblocks defined for that macroblock and does not depend on quantized part-encoded macroblocks outside the predetermined set,
receiving an indication of an output bitstream bitrate from the video encoder,
adapting the selected degree of quantization in dependence on a difference between a user-specified target bitrate for the output bitstream and the output bitstream bitrate, and
applying a variable delay to the indication of the output bitstream bitrate from the video encoder such that a current picture being quantized by the quantization circuitry is dependent on a previous picture,
wherein a predetermined number of pictures separates the current picture from the previous picture regardless of whether the video encoder has already encoded beyond the previous picture, and
wherein for at least one macroblock of the current slice the predetermined set does not include all previous output bitstream order macroblocks of the current slice.

21. A video encoder configured to perform a video encoding process comprising receiving an input video sequence and encoding the input video sequence on a slice-basis into an output bitstream, the video encoder comprising:
means for receiving the input video sequence; and
means for applying a selected degree of quantization to the encoding of macroblocks of the input video sequence to generate quantized part-encoded macroblocks,
wherein the selected degree of quantization for each macroblock in a current slice is selected in dependence on a complexity estimate indicative of an expected entropy encoding complexity of a predetermined set of the quantized part-encoded macroblocks defined for that macroblock and does not depend on quantized part-encoded macroblocks outside the predetermined set,
means for receiving an indication of an output bitstream bitrate from the video encoder, means for adapting the selected degree of quantization in dependence on a difference between a user-specified target bitrate for the output bitstream and the output bitstream bitrate, and means for applying a variable delay to the indication of the output bitstream bitrate from the video encoder such that a current picture being quantized by the quantization circuitry is dependent on a previous picture, wherein a predetermined number of pictures separates the current picture from the previous picture regardless of whether the video encoder has already encoded beyond the previous picture, and wherein for at least one macroblock of the current slice the predetermined set does not include all previous output bitstream order macroblocks of the current slice.

* * * * *